(12) United States Patent
Ryan

(10) Patent No.: US 9,057,005 B2
(45) Date of Patent: *Jun. 16, 2015

(54) CONCENTRATE FOR PREPARING A SEALING SOLUTION FOR SEALING MAIL PIECES USING TAP WATER AND METHOD OF MAKING SAME

(71) Applicant: Pitney Bowes Inc., Stamford, CT (US)

(72) Inventor: Michael S. Ryan, Newtown, CT (US)

(73) Assignee: Pitney Bowes Inc., Stamford, CT (US)

( * ) Notice: Subject to any disclaimer, the term of this patent is extended or adjusted under 35 U.S.C. 154(b) by 168 days.

This patent is subject to a terminal disclaimer.

(21) Appl. No.: 13/849,046

(22) Filed: Mar. 22, 2013

(65) Prior Publication Data

US 2014/0283708 A1 Sep. 25, 2014

(51) Int. Cl.

| C09J 11/06 | (2006.01) |
|---|---|
| C09J 201/00 | (2006.01) |
| C08K 7/14 | (2006.01) |
| C08K 5/00 | (2006.01) |
| B65D 27/00 | (2006.01) |

(52) U.S. Cl.
CPC . *C09J 11/06* (2013.01); *C08K 7/14* (2013.01); *B65D 27/00* (2013.01); *C08K 5/0041* (2013.01); *C08K 5/0058* (2013.01); *C08K 5/0091* (2013.01); *C09J 201/00* (2013.01)

(58) Field of Classification Search
CPC ........ C09J 11/06; C09J 201/00; B65D 27/00; C08K 7/14; C08K 5/0041; C08K 5/0058; C08K 5/0091
USPC .................................................. 424/405, 407
See application file for complete search history.

(56) References Cited

U.S. PATENT DOCUMENTS

| 5,108,505 | A | 4/1992 | Moffatt | |
|---|---|---|---|---|
| 7,838,447 | B2 * | 11/2010 | Clark et al. .................. | 442/123 |
| 2006/0124246 | A1 | 6/2006 | Spisinski | |
| 2007/0142259 | A1 | 6/2007 | Bernard | |
| 2008/0020961 | A1 * | 1/2008 | Rodrigues et al. ........... | 510/475 |
| 2008/0139661 | A1 | 6/2008 | Bernard | |
| 2013/0074768 | A1 * | 3/2013 | Ryan ............................ | 118/603 |

* cited by examiner

*Primary Examiner* — Jane C Oswecki
(74) *Attorney, Agent, or Firm* — Brian A. Lemm; Charles R. Malandra, Jr.; Steven J. Shapiro

(57) ABSTRACT

A powder and gel concentrate for a sealing solution is provided. The concentrate is comprised of a biocide, dye and acid buffer. This concentrate can be hydrated or dissolved using standard tap (mineralized) water to produce a sealing solution. The acid buffer keeps the minerals in the tap water suspended in solution, thereby preventing the solid scale (mineral build-up) that would otherwise clog the filters of a sealing system.

8 Claims, 2 Drawing Sheets

CONCENTRATE FOR PREPARING A SEALING SOLUTION FOR SEALING MAIL PIECES USING TAP WATER AND METHOD OF MAKING SAME

FIELD OF THE INVENTION

The invention disclosed herein relates generally to sealing solutions such as those used in mailing systems to moisten envelope flaps for sealing, and more particularly to a sealing solution concentrate that can be used to prepare a sealing solution using tap water.

BACKGROUND OF THE INVENTION

Mailing systems, such as, for example, a mailing machine, often include different modules that automate the processes of producing mail pieces. The typical mailing machine includes a variety of different modules or sub-systems each of which performs a different task on the mail piece. The mail piece is conveyed downstream utilizing a transport mechanism, such as rollers or a belt, to each of the modules. Such modules could include, for example, a singulating module, i.e., separating a stack of mail pieces such that the mail pieces are conveyed one at a time along the transport path, a stripping/moistening module, i.e., stripping open the flap of an envelope, wetting and sealing the glued flap of an envelope, a weighing module, and a metering/printing module, i.e., applying evidence of postage to the mail piece. The exact configuration of the mailing machine is, of course, particular to the needs of the user. Other types of mailing systems, such as, for example, inserters, feed material from one or more trays to be inserted into awaiting envelopes whose flaps have been opened and then sealed when the contents have been inserted.

Typically, a stripping device includes a structure for deflecting a flap of a moving envelope away from the envelope's body to enable the moistening and sealing process to occur. The deflecting structure typically includes a stripper blade that becomes inserted between the flap of the envelope and the body of the envelope as the envelope traverses the transport deck of the mailing machine. Once the flap has been stripped, a moistening device moistens the glue line on the envelope flap with a sealing solution (sometimes also referred to as a moistening solution) in preparation for sealing the envelope. Typically, a sealing fluid is deposited onto the envelope flap to activate the glue. The flap is then closed and sealed, such as, for example, by passing the closed envelope through a nip of a sealer roller to compress the envelope and flap together, and the envelope passed to the next module for continued processing.

SUMMARY OF THE INVENTION

The present invention provides a moistening/sealing solution concentrate that can be prepared using standard tap (mineralized) water without the associated problems of scale formation.

In accordance with the present invention, a powder or gel concentrate for a sealing solution is comprised of a biocide, dye and acid buffer. The powdered concentrate can be hydrated, and the gel concentrate can be dissolved, using standard tap (mineralized) water to produce a sealing solution. The acid buffer keeps the minerals in the tap water suspended in solution, thereby preventing the solid scale (mineral build-up) that would otherwise clog the filters of a sealing system. Additionally, use of the acid buffer assures that the sealing solution will maintain an acidic pH in nearly all tap waters, regardless of their initial pH. In some embodiments, an anti-scalant can also be added to reduce scaling when the tap water used for diluting or dissolving the concentrate has high levels of minerals (commonly referred to as "hard water.")

Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

DESCRIPTION OF THE DRAWINGS

The accompanying drawings, together with the general description given above and the detailed description given below, serve to explain the principles of the invention. As shown throughout the drawings, like reference numerals designate like or corresponding parts.

DETAILED DESCRIPTION OF THE PRESENT INVENTION

Figure 1:
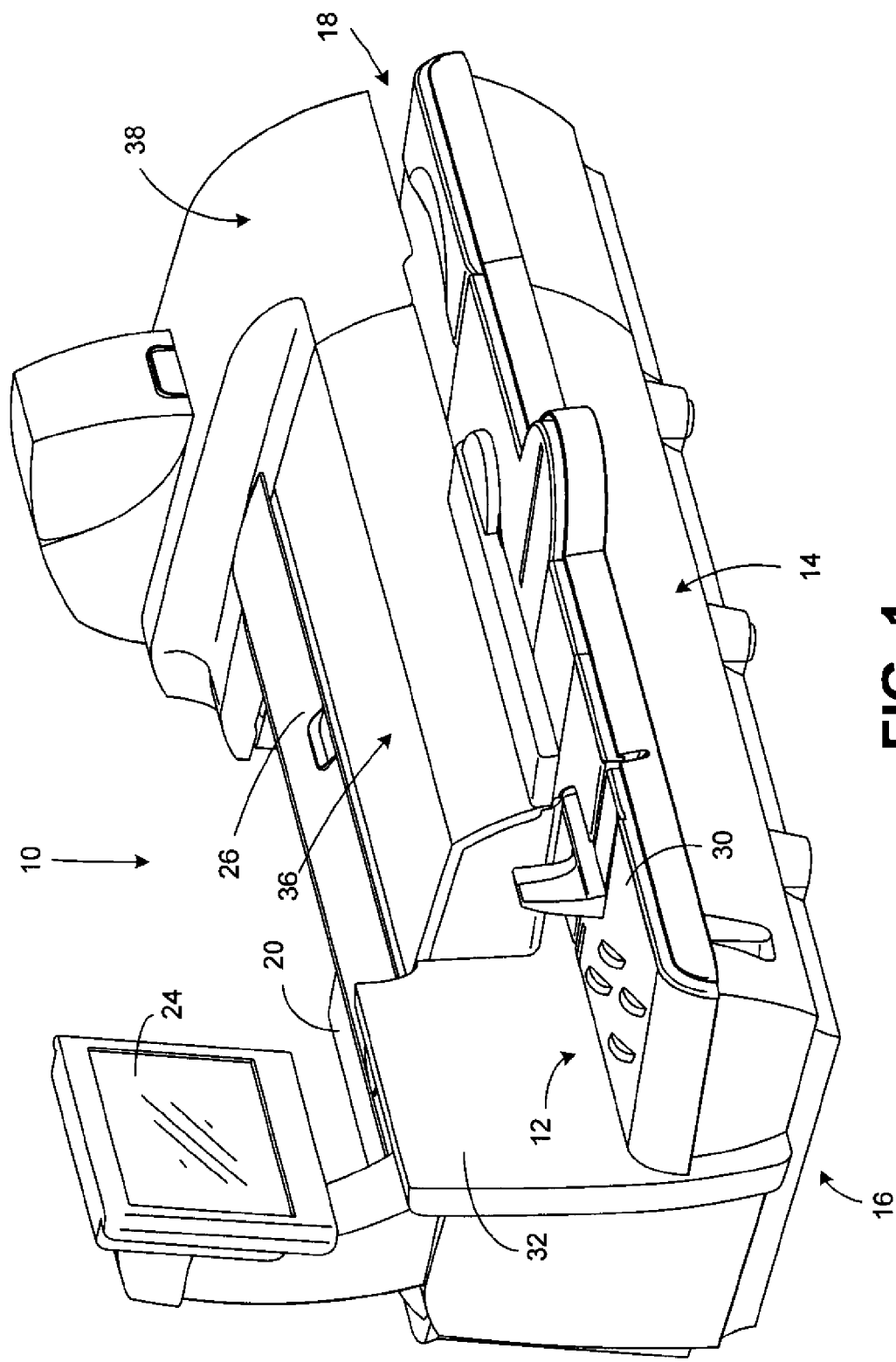
FIG. 1 illustrates a mailing machine in which the moistening solution of the present invention can be utilized.

The present invention provides a sealing solution concentrate that can be prepared using standard tap (mineralized) water without the associated problems of scale formation. Typical moistening/sealing solutions are comprised of deionized water, biocide, and dye. Deionized water is necessary to prevent scale formation, which clogs filters and hinders proper sealing. A biocide is necessary to prevent biological growth, and the dye is important to distinguish the product from standard water and for safety reasons to be sure the product is not accidentally ingested. The volume and weight of such solutions, however, render them highly inefficient to ship and requires large inventory space, as they are provided only in a liquid form. A concentrated version would be far more efficient to ship and store, and be more environmentally friendly due to transportation fuel savings/reduction in carbon emissions. A difficulty with using such a concentrate is that deionized water is not generally available at customer locations. Use of tap (mineralized) water to prepare a solution from the concentrate would lead to scale formation in the sealing unit. This scaling can quickly hinder the flow of solution through the sealer filter and pad, leading to poor sealing and ultimately shutting down the sealing operation.

The problem of scaling caused by the use of standard tap water to prepare a moistening/sealing solution is solved according to the present invention by using a concentrate comprised of an acid buffer mixed with biocide and dye. The general composition for such a concentrate is provided in Table 1 below.

TABLE 1

| General Formulation for Concentrate to Make One-Liter of Sealing Solution ||
|---|---|
| Component | Amount |
| Buffer | 9-<100% |
| Dye | 0-100 parts per million (ppm) |

TABLE 1-continued

General Formulation for Concentrate
to Make One-Liter of Sealing Solution

| Component | Amount |
|---|---|
| Biocide | 10-800 parts per billion (ppb) |
| Water | 0-80% |

The acid buffer must be non-toxic, quickly soluble, and be compatible with all materials in which it will come into contact. The acid buffer is selected such that when hydrated to form the sealing solution, it will yield a pH of the sealing solution below 5 and preferably below 4, yet above 2 for safety reasons. The acid buffer will keep dissolved the minerals found in tap water used to prepare the sealing solution from the concentrate, thereby preventing the solid scale, i.e., mineral build-up, that would otherwise clog the filters in the moistening device. Exemplary acid buffers include, for example, and without limitation, citric acid, citric acid/sodium citrate, potassium hydrogen phthalate/hydrochloric acid, acetic acid, acetic acid/sodium acetate, hydrochloric acid/sodium citrate, etc.

Tables 2 and 3 below provide illustrative examples of the materials and amounts that can be utilized to make a concentrate according to the present invention. The resultant concentrates are sufficient to prepare one-liter of sealing solution when dissolved in tap (mineralized) water. The biocide is preferably a blend of alkyl dimethyl benzyl ammonium chlorides, such as, for example, Hyamine 3500-80% (0.5% solution in DI Water), and the dye is preferably FD&C Blue Dye #1 (1.5% solution in DI Water) for each of the examples.

TABLE 2

Citric Acid/Sodium Hydrogen Phosphate (NaHPO4)
Buffered Sealing Solution Concentrate

| Citric Acid Wt., grams | NaHPO4 Wt., grams | Biocide Solution Wt., grams | Dye Solution Wt., grams | pH | Molarity (mM) |
|---|---|---|---|---|---|
| 0.08 | 0.08 | 0.0128 | 0.0107 | 4 | 1 |
| 0.84 | 0.78 | 0.0128 | 0.0107 | 4 | 10 |
| 0.13 | 0.05 | 0.0128 | 0.0107 | 3 | 1 |
| 1.27 | 0.48 | 0.0128 | 0.0107 | 3 | 10 |

TABLE 3

Citric Acid/Sodium Citrate Buffered Sealing Solution Concentrate

| Citric Acid Wt., grams | Na Citrate Wt., grams | Biocide Solution Wt., grams | Dye Solution Wt., grams | pH | Molarity (mM) |
|---|---|---|---|---|---|
| 0.13 | 0.11 | 0.0128 | 0.0107 | 4 | 1 |
| 1.31 | 1.11 | 0.0128 | 0.0107 | 4 | 10 |
| 0.18 | 0.04 | 0.0128 | 0.0107 | 3 | 1 |
| 1.80 | 0.43 | 0.0128 | 0.0107 | 3 | 10 |

A preferred procedure for preparing a powdered concentrate is to combine the acid buffer (which includes an acid and a salt), biocide solution and dye solution, and thoroughly mix the wetted powder. The wetted powder is then dried in a manner that will not melt the powder, such as, for example, by dessication or warm air drying to reduce any water content to a minimal amount. The resulting dried powder is preferably then triturated to reduce the particle size and thoroughly homogenize the particles. Reduction of the particle size will aid in dissolving the concentrate when hydrated. The resulting dried powder formed from the examples illustrated in Tables 2 and 3 above can be hydrated using tap water to produce a one-liter solution of sealing fluid. It should be noted that the dye used in the examples illustrated in Tables 2 and 3 above is in a solution form to aid in measurement and handling of such a small amount of dye. It should be understood that a powdered dye could also be used when preparing larger amounts of concentrate, as the larger amount of dye required would enable it to be accurately measured and handled. Preferably, the lower pH/higher molarity formulations should be used in particularly hard water while higher pH/lower molarity formulations may be even more economical and still useful in soft water (different tap waters around the world will have differing levels and types of hardness). Optionally, an anti-scalant such as anionic polyacrylic acid (poly acrylamide-acrylic acid) can be added for especially hard water conditions during the step of combining the acid buffer, biocide and dye. The amount of anti-scalant is preferably in the range of 0-10% for the formulation provided in Table 1 above.

In addition to a powdered concentrate, a gel concentrate can also be prepared for use as a sealing solution. The liquid acid buffer must be non-toxic and be compatible with all materials in which it will come into contact. The liquid acid buffer is selected such that when diluted to form the moistening solution, it will yield a pH of the sealing solution below 5 and preferably below 4, yet above 2 for safety reasons. Exemplary liquid acid buffers include, for example, and without limitation, acetic acid/sodium acetate trihydrate (NaOAc.3H$_2$O). Table 4 below provides an illustrative example of the materials and amounts that can be utilized to make a gel concentrate according to the present invention. The biocide is preferably a blend of alkyl dimethyl benzyl ammonium chlorides, such as, for example, Hyamine 3500-80% (0.5% solution in DI Water), and the dye is preferably FD&C Blue Dye #1 (1.5% solution in DI Water) for each of the examples.

TABLE 4

Acetic Acid/Sodium acetate trihydrate
Buffered Sealing Solution Concentrate

| Acetic Acid (2M) Wt., grams | NaOAc•3H$_2$O (2M) Wt., grams | Biocide Solution Wt., grams | Dye Solution Wt., grams | pH | Molarity (mM) |
|---|---|---|---|---|---|
| 4.1 | 0.9 | 0.0128 | 0.0107 | 4 | 10 |

A preferred procedure for preparing a gel concentrate is to combine the liquid acid buffer (which includes the acid and salt), biocide solution and dye solution, in the amounts illustrated in Table 4, to form a resulting mixture. The resulting mixture is then encapsulated in a water soluble gel pack. Such water soluble gel packs are well known and need not be described herein. The resulting gel pack can be dissolved in one-liter of tap water to produce one-liter of sealing solution. The liquid acid buffer will keep the minerals found in the tap water in solution, thereby preventing the solid scale, i.e., mineral build-up, that would otherwise clog the filters in the moistening device. Optionally, an anti-scalant such as anionic polyacrylic acid (poly acrylamide-acrylic acid) can be added for especially hard water conditions during the step of combining the acid buffer, biocide and dye. The amount of antiscalant is preferably in the range of 0-10% for the formulation provided in Table 1 above.

FIG. 1 illustrates a mailing machine 10 that includes a moistening system in which a sealing solution according to the present invention can be utilized. Mailing machine 10 comprises a base unit, designated generally by the reference numeral 14, the base unit 14 having a mail piece input end, designated generally by the reference numeral 16, and a mail piece output end, designated generally by the reference numeral 18. A control unit 20 is mounted on the base unit 14, and includes one or more input/output devices, such as, for example, a touch-screen display device 24. One or more cover members 26 are pivotally mounted on the base 14 so as to move from the closed position shown in FIG. 1 to an open position (not shown) to expose various operating components and parts for service and/or repair as needed.

The base unit 14 further includes a horizontal feed deck 30 which extends substantially from the input end 16 to the output end 18. A plurality of nudger rollers 12 are suitably mounted under the feed deck 30 and project upwardly through openings in the feed deck so that the periphery of the rollers 12 is slightly above the upper surface of the feed deck 30 and can exert a forward feeding force on a succession of mail pieces placed in the input end 16. A registration wall 32 defines a mail piece registration surface substantially perpendicular to the feed deck 30 that extends substantially from the input end 16 to the output end 18. Mail pieces placed in the input end 16 are fed by the nudger rollers 12 along the feed deck 30, with the top edge of the mail piece being registered against the wall 32. The mail pieces may be passed through one or more modules, such as, for example, a singulator module and moistening module. Each of these modules is located generally in the area indicated by reference numeral 36. The mail pieces are then passed to a metering/printing module located generally in the area indicated by reference numeral 38.

Figure 2:
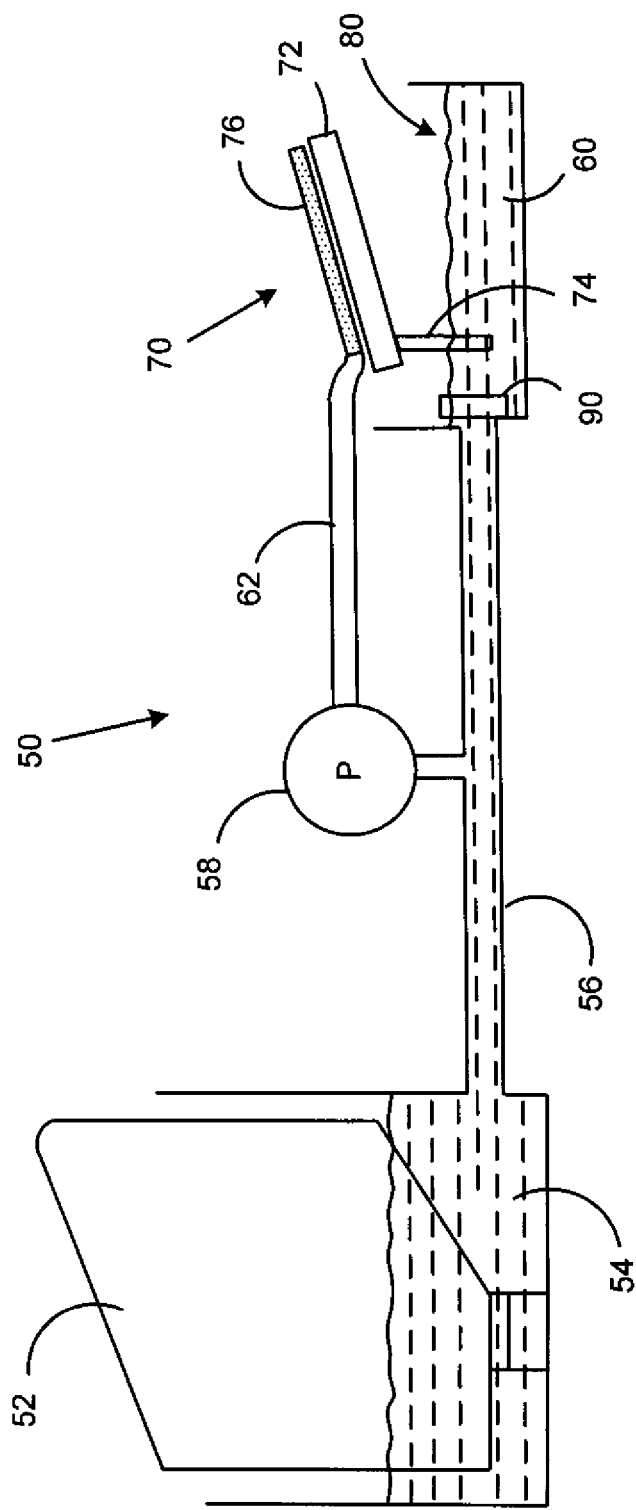
FIG. 2 illustrates a portion of a moistening system in which the moistening solution of the present can be utilized.

While FIG. 1 illustrates a mailing machine, it should be understood that the use of sealing solution of the present invention is not so limited and it can be utilized with any device that has a moistening/sealing system, such as, for example, an inserter and the like. Referring now to FIG. 2, there is illustrated in block diagram form a moistening system 50 in which the sealing solution according to the present invention can be utilized. System 50 includes a replaceable bottle 52 that can be inserted into a reservoir 54. Reservoir 54 is preferably mounted in, for example, the base unit of the mailing machine 10. Under normal operation, the sealing solution, produced using the concentrate of the present invention, contained in the bottle 52 empties into the reservoir 54. The reservoir 54 supplies the sealing solution via tubing 56 to a pump 58 and a well 60. Pump 58, via tubing 62, supplies the sealing solution to a moistening device 70. Moistening device 70 includes a wetting element 72, typically formed from a contact media such as foam or felt, which is secured to the trailing edge of a stripping blade (not shown). The wetting element 72 is supplied with sealing solution, through physical contact with a wick 74, a portion of which is located in the sealing solution 80 contained in the well 60, and capillary action of the sealing solution. The wetting element is also supplied with sealing solution via the pump 58 which supplies the sealing solution to a discharge device 76 that includes a series of openings or nozzles to distribute sealing solution onto the wetting element 72.

As an envelope passes through the moistening device 70, the inside of the envelope flap, where the glue line for sealing the flap is located, contacts the wetting element 72, such that the wetting element 72 transfers sealing solution to the flap to activate the glue. The moistening device 70 illustrated in FIG. 2 is a contact moistening system, in which sealing solution is deposited onto the glue line on a flap of an envelope by contacting the glue line with a wetting element. It should be understood, however, that the sealing solution of the present invention could also be used with other types of moistening devices, such as, for example, a non-contact moistening device, in which sealing solution is sprayed directly onto the envelope flap with a nozzle and mechanical pump system. The mechanical pump is supplied with sealing solution from a reservoir and sprays the fluid through the nozzles and onto the envelope flap.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A method for preparing a concentrate of a sealing solution for use in sealing mail pieces, the method comprising:
    combining an acid buffer, biocide solution and dye to form a combined mixture, the acid buffer yielding a pH of between approximately 2 and 5 when hydrated with tap water, to form the concentrate of the sealing solution wherein the acid buffer is a citric acid/sodium citrate buffer, a potassium hydrogen phthalate/hydrochloric acid buffer, a citric acid/sodium hydrogen phosphate buffer, an acetic acid/sodium acetate buffer, or a hydrochloric acid/sodium citrate buffer.

2. The method of claim 1, further comprising:
    drying the combined mixture to form a dried combined mixture of the sealing solution.

3. The method of claim 2, further comprising:
    triturating the dried combined mixture.

4. The method of claim 1, further comprising:
    combining an anti-scalant with the acid buffer, biocide solution and dye.

5. The method of claim 1, wherein the biocide solution is a blend of alkyl dimethyl benzyl ammonium chlorides.

6. The method of claim 2 or 3 further comprising:
    encapsulating the dried combined mixture in a water soluble gel pack.

7. A concentrate that can be used to prepare a sealing solution for use in sealing mail pieces using tap water, the concentrate comprising:
    9 to less than 100 (wt %) of an acid buffer;
    0 to 100 ppm of a dye;
    10-800 ppb of a biocide; and
    0-80 (wt %) water wherein the acid buffer is selected from the group consisting of citric acid/sodium citrate, potassium hydrogen phthalate/hydrochloric acid, citric acid/sodium hydrogen phosphate, acetic acid/sodium acetate, and hydrochloric acid/sodium citrate.

8. The concentrate of claim 7, further comprising:
    0-10 (wt %) of an anti-scalant.

* * * * *